(12) United States Patent
Langley et al.

(10) Patent No.: US 7,196,023 B2
(45) Date of Patent: Mar. 27, 2007

(54) CHEMICALLY RESISTANT RADIATION ATTENUATION BARRIER

(75) Inventors: John D. Langley, Guntersville, AL (US); Todd R. Carroll, Guntersville, AL (US)

(73) Assignee: Kappler, Inc., Guntersville, AL (US)

( * ) Notice: Subject to any disclaimer, the term of this patent is extended or adjusted under 35 U.S.C. 154(b) by 86 days.

(21) Appl. No.: 10/816,398

(22) Filed: Apr. 1, 2004

(65) Prior Publication Data

US 2005/0191918 A1    Sep. 1, 2005

Related U.S. Application Data

(60) Provisional application No. 60/461,928, filed on Apr. 10, 2003.

(51) Int. Cl.
  *B32B 27/00* (2006.01)
  *G21F 1/00* (2006.01)
  *G21F 3/00* (2006.01)
  *G21F 3/02* (2006.01)

(52) U.S. Cl. .............. 442/131; 442/132; 442/133; 250/515.1; 250/516.1

(58) Field of Classification Search ............ 250/515.1, 250/516.1; 442/131–133
See application file for complete search history.

(56) References Cited

U.S. PATENT DOCUMENTS

| | | | |
|---|---|---|---|
| 3,093,829 A | 6/1963 | Maine | |
| 3,164,840 A | 1/1965 | Reynolds | |
| 4,203,886 A | 5/1980 | Hirai et al. | |
| 4,417,146 A | 11/1983 | Herbert | |
| 4,572,960 A | 2/1986 | Ebneth et al. | |
| 4,740,526 A | 4/1988 | Yamamoto | |
| 4,753,840 A | 6/1988 | van Gompel | |
| 4,755,419 A | 7/1988 | Shah | |
| 4,833,010 A | 5/1989 | Langley | |
| 4,843,641 A | 7/1989 | Cusick et al. | |
| 4,855,178 A | 8/1989 | Langley | |
| 4,920,575 A | 5/1990 | Bartasis et al. | |
| 4,924,103 A | 5/1990 | Stein et al. | |
| 4,938,233 A | 7/1990 | Orrison, Jr. | |
| 4,943,473 A | 7/1990 | Sahatjian et al. | |
| 4,965,408 A * | 10/1990 | Chapman et al. | 174/35 MS |
| 5,035,941 A | 7/1991 | Blackburn | |
| 5,059,477 A | 10/1991 | Hendriksen | |
| 5,059,807 A | 10/1991 | Kersten et al. | |
| 5,073,984 A | 12/1991 | Tone et al. | |
| 5,245,195 A * | 9/1993 | Shah et al. | 250/515.1 |
| 5,275,861 A | 1/1994 | Vaughn | |
| 5,523,581 A | 6/1996 | Caldwalader | |
| 5,525,408 A | 6/1996 | Weir et al. | |
| 5,626,947 A | 5/1997 | Hauer et al. | |
| 5,692,935 A | 12/1997 | Smith | |

(Continued)

*Primary Examiner*—Terrel Morris
*Assistant Examiner*—Matthew Matzek
(74) *Attorney, Agent, or Firm*—Alston & Bird LLP

(57) ABSTRACT

A unique and novel multi-functional composite fabric and fabrication process for use during chemical, biological, radiological and nuclear countermeasure (CBRNC) events is disclosed. The composite fabric combines the performance characteristics of chemically resistant films and radiation attenuating polymer matrices. The composite fabric offers universal protection against a wide range of military chemical agents, toxic industrial chemicals and materials (TICS and TIMS), biological agents, as well as certain ionizing and non-ionizing forms of radiation. The composite fabric is heat sealable and can be fabricated utilizing hermetically seal seams, and has application in protective clothing and equipment, indoor and outdoor covers, containment systems, bags, drapes, gowns, remains pouches, etc.

17 Claims, 1 Drawing Sheet

U.S. PATENT DOCUMENTS

| | | |
|---|---|---|
| 5,778,888 A | 7/1998 | Sheehy |
| 5,811,359 A | 9/1998 | Romanowski |
| 5,948,708 A * | 9/1999 | Langley ................ 442/131 |
| 6,153,666 A | 11/2000 | Lagace |
| 6,183,861 B1 | 2/2001 | Carroll |
| 6,281,515 B1 | 8/2001 | Demeo et al. |
| 6,459,091 B1 | 10/2002 | DeMeo et al. |
| 2003/0010939 A1 | 1/2003 | DeMeo et al. |
| 2003/0215617 A1 | 11/2003 | Shehata et al. |
| 2004/0004196 A1 | 1/2004 | DeMeo et al. |

* cited by examiner

CHEMICALLY RESISTANT RADIATION ATTENUATION BARRIER

CROSS-REFERENCE TO RELATED APPLICATIONS

This application claims priority from U.S. Provisional Patent Application No. 60/461,928 filed Apr. 10, 2003, the disclosure of which is incorporated herein by reference

FIELD OF INVENTION

This invention relates generally to the field of chemical resistance and radiation attenuation, and more specifically to a multi-functional composite fabric for products and scenarios involving chemical, biological, radiological and nuclear countermeasure (CBRNC) events.

BACKGROUND OF THE INVENTION

Millions of protective garments are used each year to protect workers from a myriad of hazards including chemicals, physical and thermal stresses, biological challenges, and radiological hazards. Applications include general maintenance activities, automotive paint spray and finishing, pesticide application, chemical processing and manufacturing, hazardous waste handling, treatment, and disposal, emergency response, hospitals and EMS, pharmaceutical manufacturing and cleanroom applications, military situations, and innumerable other scenarios. The complexity of exposure scenarios combined with the manufacturing limitations of available polymer and rubber technologies has forced end-users to integrate various personal protective equipment components into an ensemble that together offers the necessary level of protection to ensure the health and well being of the wearer.

Traditionally, the above-mentioned hazards have been addressed separately by manufacturers and users alike. That is, protective equipment has been developed to address the radiological protective needs in the medical industry, the chemical protective needs in the chemical manufacturing industry, and the thermal and physical protective needs in the steel industry. When multiple hazards are confronted, such as is the case in industrial and military chemical/biological response, users have been left to integrate multiple pieces of protective equipment in an attempt to minimize the deleterious effects of the greatest hazards.

The increased threat of international and domestic terrorism has expanded the need for protective clothing beyond traditional boundaries, and towards individuals and workplaces that in the past had no need for such specialized equipment. This expanded threat now includes non-traditional targets that can hold large numbers of civilian personnel such as airports, professional sports stadiums, large office complexes and buildings, government facilities, and non-combative military and quasi-military installations. Combined with the new target sites for CBRNC events is the expanding threat of alternative and multi-functional hazards on the part of international terrorists. The daily threat exists for the use of chemical, biological, and radiological threats especially those associated with "dirty" bombs.

The daily threat of multiple hazards is not new. Numerous manufacturing facilities around the world contain a combination of chemical, biological, and radiological agents that if involved with an industrial accident can and do create multi-hazard release scenarios for emergency responders. While various protective garments exist to address many of the specific hazards present in controlled and uncontrolled exposures to chemical, biological, and radiological hazards, limited attempts have been made to adapt these items to collectively protect a worker. Of particular concern is the explicit omission of certain hazards from the primary industrial performance based standards for emergency responders, that being the National Fire Protection Associations (NFPA) 1991—*Standard on Vapor-Protective Ensembles for Hazardous Chemical Emergencies*. This standard in the industry recognized document for hazmat first responders. While this document addresses many of the protective needs of first responders, it explicitly omits any relevance to radiological hazards which is an obvious threat to applicable responders. While numerous high chemical barrier fabrics have been developed for civilian and military use, none yet have been developed that can address the collective needs of a multi-hazard CBRNC event.

The U.S. Environmental Protection agency (USEPA), through their *Standard Operating Guidelines*, have put forth a generic strategy for defining what they term "Levels of Protection" (LOPs). These LOPs revolve around generic types of respiratory protection, as defined by the Occupational Safety and Health Department (OSHA) and the National Institute for Occupational Safety and Health (NIOSH), and generically described chemical protective clothing, recommended for certain chemical handling activities. The protective clothing industry has and continues to use these guidelines to generically describe the types of garments to be used under various use scenarios.

Level "A" is defined as the highest level of respiratory and chemical protection incorporating supplied air (i.e., SCBA or airline respirator) and a fully encapsulating, gas-tight suit. Level "A" ensembles offer the wearer protection against both liquids and vapors. The interface between the glove and sleeve are gas and liquid-tight, typically consisting of a circular plastic or metal glove-ring that is used as a form around which the glove and sleeve are fitted and than secured with a worm-drive or stepless ear hose-clamp. Level "A" type garments are used by highly trained individuals in situations involving unknown chemicals and a variety of other exposure scenarios involving high exposure potential and carcinogenic hazards. These readily available garments vary in price from about $500 to about $3500, and are available from a variety of manufacturers such as DuPont (USA), Lakeland Industries (USA), Trelleborg (Sweden), Respirex (United Kingdom), Auer (Germany), Draeger (Germany) as well as others. Base fabrics of construction include both lightweight high-chemical barrier composites such as Responder® (DuPont) and TyChem® 10,000 (DuPont), to heavier-weight elastomers such as Viton® and Chlorobutyl from Trelleborg. While offering the highest level of protection to the wearer from both the design/configuration and fabrics of construction, Level A garments are expensive, difficult to don/doff, require an annual inspection program, consume a fairly large volume for the purposes of storage, and require respirator fit testing and medical clearance on the part of the wearer prior to use.

The next lower level of protection described by EPA is Level "B", which is described as requiring the same respiratory protection as Level "A" but with a lesser degree of chemical protection, typically not fully-encapsulating. A traditional Level "B" ensemble includes a self-contained breathing apparatus (i.e., SCBA), a sealed-seam, limited-use coverall with an attached hood, storm-flap, and attached booties, and separate chemically resistant gloves and elastomeric over-boots. It has become common practice to use duct-tape over the glove-sleeve and boot-leg interfaces to minimize penetration of chemicals onto the wearer's skin and clothing. Level "B" type garments are available from a wide variety of manufactures fabricated from an even wider array of base materials both film-based and elastomeric.

EPA's Level "C", describes a lesser level of protection than Level B, and includes a lower degree of respiratory protection (i.e., air-purifying respirators), however with similar clothing requirements as in Level "B". Since the chemical hazards and exposures scenarios requiring Level "C" protection are less hazardous than Level "B", "taping" is less common but still used. Level "C" type garments are available in a variety of configurations both one piece and multiple piece, fabricated using a variety of protective fabrics, and incorporating several types of seams, which all affect the ultimate protection afforded the wearer. Unlike Level "B" garments, which are most often constructed using a sealed seam, Level "C", garments are offered with sealed, bounded, and simple sewn seams. Any non-sealed seam, by construction, has the potential for allowing influx of hazardous chemicals, thus exposing the wearer.

Level "D" protection is the lowest level of protection described by EPA and is used in situations where there is no risk of respiratory exposure and very limited potential for exposure to low hazard chemicals. Chemical protective clothing is allowable under Level "D", however, rarely worn.

The protective needs of the chemical industry are fairly well met with an array of fabrics, materials, and protective items available to the industrial and military user communities. The majority of chemical protective clothing used by general industry is based on "barrier" technology. Barrier technology hinges on the principle that the protective material essentially blocks the transport of a chemical through the material. The chemical resistance of "barrier" type materials is dictated by Fick's Law of Diffusion, and the solubility of the chemical hazard(s) in the polymer matrix of the protective material. The industry standard used for evaluating chemical resistance is the American Society for Testing and Materials (ASTM) F739—*Standard Test Method for Resistance of Protective Clothing Materials to Permeation by Liquids and Gases*. This method is applicable to essentially any chemical and all chemical forms (i.e., solids, liquids, and gases).

Numerous attempts have been made to develop chemical protective fabrics that offer a wide range of chemical resistance. Examples of such fabrics are described in Bartasis (U.S. Pat. No. 4,920,575), Blackburn (U.S. Pat. No. 5,035, 941), Hauer et al. (U.S. Pat. No. 5,626,947), Hendriksen (U.S. Pat. No. 5,059,477), Langley (U.S. Pat. Nos. 4,833, 010, 4,855,178, and 5,948,708), Sahatjian et al. (U.S. Pat. No. 4,943,473), Shah (U.S. Pat. No. 4,755,419), van Gompel (U.S. Pat. No. 4,753,840), as well as many others, the contents all of which are incorporated herein by reference in their entireties.

Each of the above mentioned approaches incorporates various types of continuous single and multiple layered chemical barriers, and strength enhancing substrates, scrims, and reinforcing base fabrics to achieve the desired level of chemical resistance and physical durability while maintaining acceptable flexibility. These and other "barrier" approaches today make up what is termed the limited-use chemical protective clothing market. Hazardous material emergency response requires a degree of preparedness that can only be achieved by utilizing protective products that offer performance to a wide range of response scenarios. The most widely used chemical garments offer this type performance and are composed of multiple polymer composites comprising barriers such as polyvinyl chloride, chlorinated polyethylene, chlorinated butyl, polyethylene, high density polyethylene, low density polyethylene, linear low density polyethylene, polypropylene, polyurethane, PTFE, combinations thereof, or multiple-layered coextruded films which include one or more layers of ethylene-vinyl acetate, ethylene vinyl alcohol, polyvinyl alcohol, nylon, ionomers, polyester, polyvinylidine chloride, PET, liquid crystal polymers, metallized films, fluoro-chemical based films, and/or blends thereof. These products offer a broad range of chemical resistance and have proven effective in chemical response scenarios, but are essentially useless when exposed to ionizing radiation.

The protective needs of the radiological industry are being met to a lesser degree. It is common practice to address radiological hazards from the perspective of time, distance, and shielding. That is, limit the overall time of exposure to a source, maximize the distance between the source and the affected individual(s), and finally shield the source from the work environment. Protective clothing can be categorized under the "shielding" aspect of this three step protective strategy.

Radiation can generally be classified as ionizing and non-ionizing. Protective strategies and equipment employed to address these types of radiation are very different due the differences in the human response and the overall control of the sources. Common non-ionizing sources include solar and manmade UV irradiation and electromagnetic radiation (i.e., radio frequency and microwave). Physiological response to non-ionizing radiation is more chronic in nature and occurs over repeated exposures over a long duration. The protective requirements to limit this type exposure can be met with barrier creams in the case of UV exposure, and lightweight metallized fabrics, textiles, and films for electromagnetic radiation such as are described by Reynolds (U.S. Pat. No. 3,164,840) and Ebneth (U.S. Pat. No. 4,572, 960), Vaughn (U.S. Pat. No. 5,275,861) as well as others.

Ionizing radiation presents a greater and more immediate risk upon exposure including decapacitation and under extreme conditions death. As such, ionizing radiation is a more obvious choice during terrorist activities. Sources for ionizing radiation include military weaponry, nuclear power plants, and medical x-rays. The requirements for protection within nuclear plants is achieved primarily through shielding while a combination of shielding (i.e., drapes & curtains) and partial body protective devices are used within the medical arena. Protective shielding materials fabricated with lead and lead oxides, examples of which are described by Maine (U.S. Pat. No. 3,093,829), Weir (U.S. Pat. No. 5,525,408), and Yamamoto (U.S. Pat. No. 4,740,526) have dominated this market. As mentioned above, since the source and path of ionizing radiation is typically closely controlled it has been common practice to use partial body protective covers to shield those areas of the body that are particularly susceptible to ionizing radiation including the thyroid area, male and female gonadal regions, and the breast area. Exemplary partial body covers and aprons are described by Herbert (U.S. Pat. No. 4,417,146), Cusick (U.S. Pat. No. 4,843,641), Stein (U.S. Pat. No. 4,924,103), Caldwalader (U.S. Pat. No. 5,523,581), Sheehy (U.S. Pat. No. 5,778,888), and Tone (U.S. Pat. No. 5,073,984). While practical in partial body configurations and designed for very short term use, these fabrics and items are of little use in uncontrolled industrial and military CBRN events. Furthermore, there are inherent toxicological risks and disposal issues involved with the use of lead and derivative type materials and products.

Significant progress has been made in addressing the toxicity issues surrounding lead-containing radiation protective materials. Numerous alternative radiopaque materials exist that can replace lead in radiation attenuation applications. Lagace (U.S. Pat. No. 6,153,666) describes several alternative radiation attenuating additives including barium sulfate or other barium salts, tin, boron or its compounds, bismuth compounds, or other heavy metals including antimony, bismuth, gold, thallium, tantalum, uranium, zirconium or non-metals such as iodine. Lagace goes on to state that barium sulfate has become a preferred attenuant as disclosed by Shah (U.S. Pat. No. 5,245,195), Orrison (U.S. Pat. No. 4,938,233), and Hirai (U.S. Pat. No. 4,203,886). DeMeo (U.S. Pat. Nos. 6,281,515 and 6,459,091) disclose the use of barium compounds as attenuants in breathable medical devices such as facemasks.

Lagace presents a comprehensive overview of the myriad of polymer matrices that can be used as carriers of the radiation attenuants including thermoplastic materials such as polyolefins including polyethylene and polypropylene, vinyl polymers such as polyvinyl acetate and vinyl acetate copolymers, acrylic polymers such as polymethylenthacrylate, and certain thermoset polymers such as silicones, urethane polymers, and elastomeric materials such as styrene-butadiene rubber, styrene-isoprene rubber, polybutadiene, polyisoprene, butyl rubber, epoxy polymers and the like.

It should be evident from the above discussion that an immediate need exists for products designed and configured so as to offer multi-functional resistance to a wide range of CBRN hazards. The present invention addresses many of the limitations of existing protective strategies as well as the related prior art and puts forth an improved composite fabric that offers universal protection against a wide range of military chemical agents, toxic industrial chemicals and materials (TICS and TIMS), biological agents, as well as certain ionizing and non-ionizing forms of radiation.

SUMMARY OF THE INVENTION

The present invention provides a novel composite fabric that comprises at least one chemical barrier layer and at least one radiation attenuation layer. The composite fabric has at least 8 hours resistance to the military chemical agents distilled mustard (HD), Sarin (GB), Soman (GD), Lewisite (L), and Nerve Agent (Vx), and the composite further passes the ASTM F1671 standard for resistance to blood-borne pathogens. Preferably, the composite fabric also exhibits a permeation efficiency greater than 25% when exposed to the 21 chemicals included on ASTM F1001. Advantageous embodiments of the invention also exhibit an attenuation factor of at least 50% of a primary 100 kVp x-ray beam.

The chemical barrier layer may suitably comprise a multiple layered coextruded film including at least one barrier selected from the group consisting of polyvinyl chloride, chlorinated polyethylene, chlorinated butyl, polyethylene, high density polyethylene, low density polyethylene, linear low density polyethylene, polypropylene, polyurethane, PTFE, ethylene-vinyl acetate, ethylene vinyl alcohol, polyvinyl alcohol, nylon, ionomers, polyester, polyvinylidene chloride, liquid crystal polymers, metallized films, or blends or combinations thereof. The radiation attenuation layer may suitably comprise a mixture of a polymer matrix and a radiation attenuant filler such as barium or other barium compounds including barium sulfate and barium salts, and various other attenuants.

In one advantageous embodiment, the chemically resistant radiation attenuation composite barrier fabric comprises a first ply having radiation attenuation properties and comprising a mixture of a polymer matrix and a radiation attenuant, and a second ply having chemical barrier properties and comprising a sheet material including at least two polymer layers of different composition. Particularly suitable for this purpose is a multiple-layered coextruded film which includes one or more layers of ethylene-vinyl acetate, ethylene vinyl alcohol, polyvinyl alcohol, nylon, ionomers, polyester, polyvinylidene chloride, PET, liquid crystal polymers, metallized films, fluorochemical based films, and/or blends thereof. Preferably, the coextruded film has outer heat sealable layers defining the opposite outer surfaces of the second ply and an interior core layer of a polymer having chemical barrier properties. The composite may additionally include a reinforcing ply comprising a woven, nonwoven or knitted fabric. The composite fabric may additionally include an EMF shielding ply such as a metallized film or metallized fabric.

In a further advantageous specific embodiment, the barrier fabric comprises a radiation attenuation layer comprising a spunbond polypropylene supporting substrate, a film formed of a thermoplastic polyolefin matrix containing 40–80% by weight barium sulfate covering one surface of the spunbond polypropylene supporting substrate, and a knit fabric layer adhered to the film. A chemical barrier layer is adhered to a surface of the spunbond polypropylene supporting substrate The chemical barrier layer comprises a coextruded barrier film having polyolefin outer layers and a polyvinylidene chloride interior layer.

The composite material is preferably heat sealable and can be fabricated utilizing hermetically seal seams. It has application in protective clothing and equipment, indoor and outdoor covers, containment systems, bags, drapes, gowns, patient wraps, seam tapes, remains pouches, etc.

The modulus and rigidity of the end product is controlled by the thickness and selected polymer matrix, selected attenuant or combination of attenuants along with attenuant concentration, particle size, and particle size distribution. Greater or less rigidity may be desirable in different attenuating applications. Shah (U.S. Pat. No. 5,245,195), Kersten (U.S. Pat. No. 5,059,807), Orrison (U.S. Pat. No. 4,938,233), and Hirai (U.S. Pat. No. 4,203,886) the contents all of which are incorporated herein by reference in their entireties, describe various attenuant filled polymer matrices, variations of which have application to the present invention.

While some chemical resistance will be offered by the attenuant filled polymer matrix, high and broad chemical resistance can only be achieved through the combination of multi-layer high chemical barrier films and attenuant filled polymer layers. This is especially true in protective garment applications where flexibility, drape, and hand are critical to achieving a functional product.

The novelty of the present invention comes in combining the chemical resistance of high chemical barrier films with the radiation attenuating properties of attenuant filled polymer matrices. This unique and novel combination of multiple performance is not known in the art.

The methods and techniques used to combine attenuating and chemical barrier layers is also critical based on the ultimate end use of the product. The present invention can accommodate all traditional laminating techniques know in the art including extrusion lamination, calendering, solvent and aqueous-based adhesive lamination, flame lamination, ultrasonic lamination, thermal lamination and the like.

The present invention can also be used as a platform for additional layers of specified performance in the end composite including physical and flame protection, anti-static properties, tactical deception properties, ballistic protection, etc.

BRIEF DESCRIPTION OF THE SEVERAL VIEWS OF THE DRAWINGS

Figure 1:
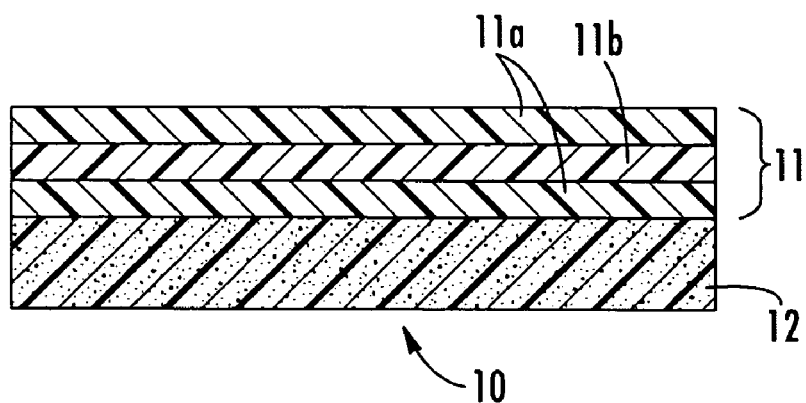

Having thus described the invention in general terms, reference will now be made to the accompanying drawings, which are not necessarily drawn to scale, and wherein:

FIG. 1 is a cross-sectional view of a composite barrier fabric in accordance with one embodiment of the present invention.

Figure 2:
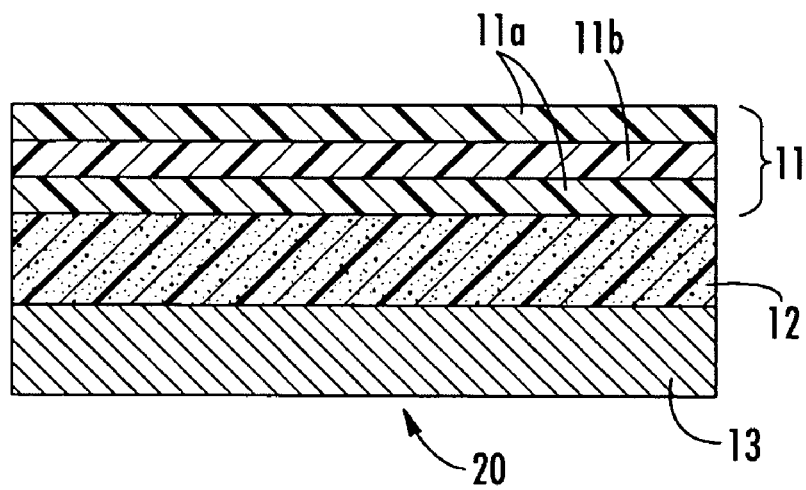

FIG. 2 is a cross-sectional view showing a more complex composite barrier fabric in accordance with another embodiment of the present invention.

Figure 3:
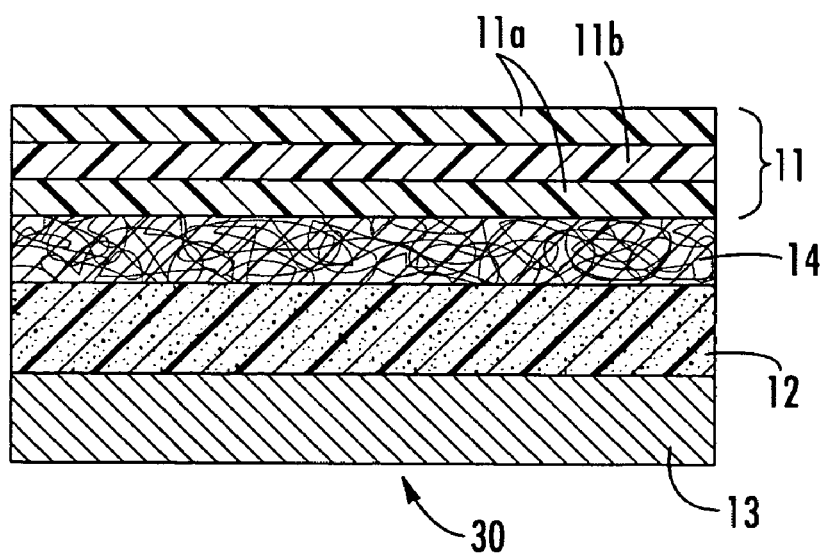

FIG. 3 is a cross-sectional view showing yet another composite barrier fabric in accordance with the principles of the present invention.

DESCRIPTION OF ILLUSTRATIVE EMBODIMENTS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention can accommodate a variety of barrier fabrics, additives, and surface modifications as well as a multitude of radiation attenuants and/or combinations of different attenuants in various polymer matrices so long as the end product exhibits the requisite chemical resistance and radiation attenuation characteristics. The chemically resistant radiation attenuation barrier fabric of the present invention is a composite including at least two layers or plies: a layer having chemical barrier properties and a layer having radiation attenuation properties. The composite can have additional chemical barrier layers or radiation attenuation layers, and may also have additional layers for reinforcement or to provide a particular desired surface appearance or texture. The end-use application for the radiation attenuating chemical barrier will determine the flexibility characteristics of the composite barrier fabric. It should be evident to those skilled in the art that greater flexibility is required for wearing apparel applications while a more rigid material might be applicable for a shelter or cover. Flexibility in the subject composite can be controlled by appropriate selection of the thickness, the composition of the polymer matrix, the nature, size, size distribution, and percent attenuant used in the polymer matrix, other additives compounded into the polymer matrix (i.e., plasticizers), the specific chemical film or films used in combination with the attenuating layer, laminating materials and techniques used to combine the chemical and attenuating layers, and finally the characteristics of any additional layers and laminating components and techniques used in the final composite.

The ply having radiation attenuation properties may, in one embodiment of the invention, comprise a filled polymer film containing one or more filler materials that function to block or attenuate radiation. The polymer matrix of the radiation attenuation ply may comprise one or more polymers selected from the group consisting of polyolefins, polyethylene, polypropylene, thermal polyolefins, thermal polyolefin elastomer, vinyl polymers, polyvinyl acetate, vinyl acetate copolymers, acrylic polymers, polymethylenthacrylate, thermoset polymers, silicones, urethane polymers, elastomeric compounds, styrene-butadiene rubber, styrene-isoprene rubber, polybutadiene, polyisoprene, butyl rubber, epoxy polymers, polyvinyl alcohol, natural latex, ethylene vinyl acetate, polyester, and blends thereof. Low modulus polymers such as thermoplastic polyolefins, and more specifically ethylene vinyl acetate, ethylene methyl acrylic, and other soft polyolefinic compounds such as those based on metallocene are preferred. In one embodiment the base polymer matrix can be selected from the group of thermoplastic polyolefin elastomers (TPO) which result in very tough durable end products as a result of the EPDM rubber component of the TPO.

The radiation attenuant material may comprise one or more finely divided filler materials selected from the group consisting of barium or other barium compounds including barium sulfate and barium salts, tin, boron or its compounds, bismuth compounds, tungsten, antimony, gold, thallium, tantalum, uranium, zirconium or non-metals such as iodine, diatrizoate meglumine inj USP, acetrizoate sodium, bunamiodyl sodium, diatrizoate sodium, ethiodized oil, iobenzamic acid, iocarmic acid, Iocetamic acid, iodipamide, iodixanol, iodized oil, iodoalphionic acid, o-Iodohippurate sodium, iodophthalein sodium, iodopyracet, ioglycamic acid, iohexol, iomeglamic acid, iopamidol, iopanoic acid, iopentol, iophendylate, iophenoxic acid, iopromide, iopronic acid, iopydol, iopydone, iothalamic acid, iotrolan, ioversol, ioxaglic acid, ioxilan, ipodate, meglumine acetrizoate, meglumine ditrizoate methiodal sodium, metrizamide, metrizoic acid, phenobutiodil, phentetiothalein sodium, propryliodone, sodium iodomethamate, sozoiodolic acid, thorium oxide and trypanoate sodium. Barium sulfate is preferred due to its ready availability, economics, ease of dispersibility, and attenuation capacity.

The radiation attenuant filled polymer film can be formed by conventional compounding and film forming processes including cast and blown film extrusion, extrusion coating, knife over roll coating, solution casting, and solution spinning. Product can be in the form of a free film if the equipment includes release lined (e.g. Teflon® coated or lined) drums and rollers to prevent sticking of the attenuating film, or it can be in the form of an attenuant filled polymer layer on a support substrate such as an air-laid or spunbonded nonwoven to prevent undesired sticking to process equipment. The attenuating film may typically have a thickness of from about 0.5 to about 4 mm depending on the desired level of attenuation.

In a preferred embodiment, selection of the base polymer matrix is determined by the subsequent chemical barrier film(s) and the ultimate lamination technique employed. Preferred are those polymer matrices that can be easily laminated to the selected chemical films according to traditional extrusion lamination and more preferred, thermal calendering techniques. To accomplish the latter, the exterior layer of the chemical film must be thermally compatible (i.e., fusible) with the exterior layer of the attenuating film thus allowing the use of simple thermal calendering lamination to achieve a satisfactory bond. This simplified approach is void of any adhesives and thus will result in the most flexible composite achievable.

Where the attenuating polymer layer and film layers are not thermally compatible, alternative lamination techniques must be employed to join the dissimilar surfaces. Here again, techniques known to those skilled in the art can be used based on the specific nature of the opposing surfaces. In one embodiment a nylon surface of a multi-layered chemical film is first primed with a mica based agent to promote adhesion to a thermoplastic adhesive tie layer comprised of a blend of ethylene methyl acrylate, ethylene vinyl acetate, and low density polyethylene. This blend of pliable thermoplastics is applied at between 1.0 and 1.5 mils and maintains the overall flexibility of the attenuating chemical barrier composite.

In a further embodiment, the chemical film is brought into close proximity with a nonwoven that is offered as an integral part of the attenuating barrier. In this embodiment lamination of the attenuating and chemical barriers can be accomplished thermally, such as is the case when using a Saranex® 35-P film.

The ply having chemical barrier properties can be any of various types of continuous single layer or multiple layer chemical barrier films that incorporate polymers that are barriers to military warfare agents as well as other toxic industrial chemicals and materials, such as for example polyvinylidene chloride (PVDC), ethylene vinyl alcohol copolymer (EVOH), nylons, acrylonitrile methacrylate copolymer (AN-MA), polyvinyl alcohol (PVOH), and others. Particularly suitable due to their inherent softness and flexibility are multi-layer coextruded films that include polyvinylidene chloride (PVDC) with exterior layers of melt processable polymers (i.e., linear low density polyethylene (LLDPE), ethylene vinyl acetate (EVA), and chlorinated polyethylene (CPE)), commercially available examples of which include the Saranex® series of barrier films available from Dow Chemical Company, Midland Mich., such as Saranex® 14-P, Saranex® 23-P, Saranex® 35-P.

While the Saranex® line of films offer good chemical resistance other multi-layered films can also be used to offer resistance to an expanded list of chemicals. Films such as these are available through Printpack, Inc. under the product designation C181-407 which is a 1.25-2 mil coextrusion described as EVA/LLDPE/Nylon/EvOH/Nylon/LLDPE/EVA. The exposed EVA surfaces of this film make it uniquely suited for the present invention. Other alternative films having application include a 2-4 mil EVA/LLDPE/Nylon/LLDPE/EVA available through Printpack under the designation C171-490, a 1.5-2.2 mil HDPE/Nylon/EVA+ ionomer blend under the designation C575-416, and a 2-6 mil LLDPE/EvOH/LLDPE available under the designation C383-386.

The above listed Printpack films are produced by a casting process. While these have greater applicability due to their improvement in softness, traditional blown films also have applicability, however, at the expense of some degree of flexibility resulting from the orientation that occurs during the blowing process. Blown films having application to the present invention, especially those embodiments wherein the primary lamination technique is thermal calendering, include a 4 mil LLDPE+EVA/Nylon/LLDPE available under the designation B373T-609 and a 3 mil HDPE/Nylon/EVA available under the designation B579AP-730, both of which are also available through Printpack.

The chemical barrier ply and the radiation attenuation ply can be joined directly to one another using traditional laminating techniques, as described earlier. The composite fabric of the present invention can also incorporate one or more additional plies for providing strength and reinforcement or for providing various desired appearance or physical properties to the exposed surface of the composite fabric. Suitable strength-enhancing plies may include woven, knitted or nonwoven fabrics or scrims, including for example spunbonded polypropylene nonwoven webs, needle-punched nonwoven fabrics, slit-film scrims, etc. The reinforcing or strengthening ply can be located between the chemical barrier ply and the radiation attenuation ply, or at an exposed surface of the composite. In addition, one or more of the plies of the composite fabric can include a bactericidal, viracidal, and/or sporecidal surface treatment and/or polymer additive. Further, one or more plies may comprise an organophosphate hydrolase enzyme and/or oxidizing polymer thus rendering the composite reactive to phosphorous-based and oxidizable chemicals such as military chemical warfare agents.

The chemically resistant radiation attenuation composite barrier fabric of the present invention can also be provided with the capability of shielding against electromagnetic fields (EMF). In further embodiments of the invention, the composite can include an EMF shielding layer which may comprise, for example, a metallized film, metallized fabrics, conductive fibers, conductive fillers. Well known vapor deposition techniques can be used to apply a metallized coating to a substrate such as a polypropylene film or polyester film or a woven or nonwoven substrate, such as a spunbond nonwoven web.

FIG. 1 schematically illustrates a two-ply composite fabric 10 in accordance with the present invention. It includes a chemical barrier film 11, the exterior layer of which is adhered to a radiation attenuating ply 12 by thermal lamination. The chemical barrier film in this illustrated embodiment is preferably a multi-layer coextruded film with heat-sealable exterior surfaces 11a and a core 11b having chemical barrier properties, the layers 11a and 11b being made from the polymers described earlier. The radiation attenuating ply is a radiation attenuant filled polymer film as described earlier.

In FIG. 2, the composite fabric 20 additionally includes a layer 13 of a soft knit nylon fabric overlying the radiation attenuating ply 12 and forming one outer surface of the composite. The knit fabric layer 13 can be printed with a suitable pattern, such as a camouflage pattern for example.

The chemically resistant radiation attenuation composite fabric 30 of FIG. 3 is of similar construction to the fabric 20 of FIG. 2, with the exception that an additional strength enhancing ply 14 in the form of a 2 ounce per square yard polypropylene spunbond nonwoven fabric is sandwiched between the chemical barrier ply 11 and the radiation attenuation ply 12 and adhered to both plies 11 and 12.

The chemically resistant radiation attenuation barrier composite fabrics of the present invention advantageously have at least 8 hours resistance to the military chemical agents distilled mustard (HD), Sarin (GB), Soman (GD), Lewisite (L), and Nerve Agent (Vx) when tested according to test method CRDC-SP-84010; Laboratory Methods for Evaluating Protective Clothing Systems Against Chemical Agents June 1984. The test is conducted at an agent exposure concentration of 10 g/m2. Breakthrough criteria are according to TOP 8-2-501. The composite fabrics also advantageously pass the ASTM F1671 standard test method for resistance to blood-borne pathogens.

Preferably, the composite fabric also exhibits a permeation efficiency greater than 25%, more desirably greater than 50%, and most desirably greater than 75%, when exposed to the 15 liquid chemicals included on ASTM F1001. The following liquid chemicals are listed in the American Society for Testing and Materials Test Method F1001 as the Standard Battery of Chemicals for testing chemical resistance: Acetone; Acetonitrile; Carbon Disulfide; Dichloromethane; Diethylamine; Dimethylformamide; Ethyl Acetate; n-Hexane; Methanol; Nitrobenzene; Sodium Hydroxide; Sulfuric Acid; Tetrachloroethylene; Tetrahydrofuran; Toluene. This battery of chemical has become a common tool for manufacturers and users when comparing the performance of protective fabrics.

As described in Carroll U.S. Pat. No. 6,183,861, a value called "permeation efficiency" has been commonly used in connection with chemical protective fabrics as a way to easily compare the relative chemical resistances of chemical barrier fabric materials. Permeation efficiency is determined by testing the material in accordance with ASTM F739—Standard Test Method for Resistance of Protective Clothing Materials to Permeation by Liquids and Gases to determine the breakthrough time for each of the 15 above-listed liquid chemicals of ASTM F1001. Breakthrough time is in effect the length of time that a barrier would protect a user from contact with the challenge chemical. The "permeation efficiency" is calculated by adding the breakthrough times for the chemicals tested and dividing by the total number of chemicals tested multiplied times 480 minutes (i.e. 8 hours). Eight hours represents the duration of the permeation test and has become the defacto target level of performance (i.e., breakthrough time) desired by end-users when considering chemical resistance data. Thus, a barrier fabric that had a breakthrough time of at least 8 hours for each of the chemicals tested would have a permeation efficiency of 100%.

The degree of radiation attenuation achieved by the composite fabric may be measured by irradiating a sample with a primary 100 kVp x-ray beam, measuring the intensity of the beam, and dividing this value by the intensity measured without the sample in place to obtain an "attenuation factor". The composite desirably has an attenuation factor of at least 50%.

EXAMPLES

The following non-limiting examples are intended to illustrate various embodiments within the scope of the present invention and are not intended to limit the invention in any manner.

Example 1

A radiation attenuation layer is produced by compounding a thermoplastic polyolefin matrix comprised primarily of EVA and one or more additional additives (i.e., plasticizers and processing aids) with 40–80% by weight barium sulfate and extruding a 0.5 mil to 30 mil, and more specifically a film of 20 mil thickness, onto a 0.25–4.0 ounce per square yard layer of spunbond polypropylene (SBPP), and more specifically a 0.5 osy layer of SBPP layer. The attenuant-filled film is brought into contact with the nonwoven as the nonwoven is directed through a nip formed by a pair of smooth-surfaced nip rolls. After passing through the nip, the extruded film is cooled and solidified while in contact with unheated rolls prior to wind-up.

The thus-formed nonwoven/attenuating composite is further laminated to a knitted polyester outer fabric using a solvent-based polyurethane adhesive. This radiation attenuating composite is subsequently thermally laminated to a chemical barrier. In this embodiment the nonwoven surface of the attenuating layer is brought into contact while under heat and pressure, with the EVA surface of a Saran®-based coextruded film commercially available from Dow Chemical Company, Midland, Mich. under the designation Saranex® 35-P. This coextruded film has polyolefin outer layers and a polyvinylidene chloride core.

The radiation attenuating chemical barrier according to this example showed no detectible permeation in greater than 8 hours when tested against the military blister agent HD (i.e., distilled mustard) and nerve agent GD (i.e., Soman) according to test method CRDC-SP-84010; *Laboratory Methods for Evaluating Protective Clothing Systems Against Chemical Agents June* 1984. The test temperature was 30° C. at an agent exposure concentration of 10 g/m². Breakthrough criteria were according to TOP 8-2-501 and were 4.0 µg/cm² for HD and 1.25 µg/cm² for GD. The unlaminated attenuating component of the composite was also tested and showed breakthough of HD in <2hrs and for GD in 6–8 hrs.

Example 2

A composite fabric is produced as in Example 1, except that the chemical barrier layer is a seven-layer coextruded film including layers of ethylene vinyl alcohol, nylon, and polyolefin, such as is commercially available from Printpack, Inc. under the designation C181-407.

Example 3

A composite fabric is produced as in Example 1 except that the chemical barrier layer is Saranex® 23-P as available from Dow Chemical Company.

Example 4

A radiation attenuation layer is produced by compounding polyurethane with 40–80 percent by weight barium sulfate, and forming the composition into a continuous nonporous film. This radiation attenuation layer is laminated directly to a chemical barrier film available from Printpack, Inc. under the designation C575W-416 using a discontinuous solvent based polyurethane adhesive.

Example 5

A radiation attenuation layer is produced generally as described in Examples 1 and 3 above, however the spunbond polypropylene nonwoven is replaced with a strength enhancing scrim as available from Atlanta Nisseki Claf Inc. (Atlanta, Ga.) under the designation CLAF® LS9215.

Example 6

A radiation attenuation layer is produced by blending a plastisol-based polyvinyl chloride with about 50 parts by weight barium sulfate per part of the polymer. This blend is formed into a film according to the knife over roll process while spreading the matrix onto a 3 oz/yd² needle punched polypropylene available from Amoco under the designation Duon 830. The attenuating layer is subsequently laminated to an EVOH containing barrier film. More particularly, the LLDPE surface of an EVOH containing coextruded film available from Printpack, Inc. under the designation C383-386 is laminated to the Duon surface of the attenuating layer using a layer of adhesive comprised of a blend of LDPE and EVA in a thickness between 1.0 and 1.5 mils. Pigments can be further compounded into the adhesive tie layer to introduce color into the final composite.

Example 7

A further example comprises casting the same attenuant filled polymer matrix described in Example 1 on each exterior surface of the Saranexe® 35-P film, thus burying the chemical layer between two layers of the radiation attenuating polymer matrix. This composite can be used as is or further laminated to additional textile (i.e., woven or nonwoven) or chemical layers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A chemically resistant rediation attenuation composite barrier fabric comprising a first ply having ionizing radiation attenuation properties and comprising a mixture of a polumer matrix and an ionizing radiation attenuant, a second ply having chemical barrier properties and comprising a sheet material including at least two polymer layers of different composition, and additionally including an electromagnetic field shielding ply.

2. The composite fabric according to claim 1 wherein the electromagnetic field shielding ply is selected from the group consisting of metallized films and metallized fabrics.

3. The composite fabric of claim 1, wherein at least one of the exterior surfaces of the composite fabric is heat-sealable.

4. The composite fabric of claim 1 wherein the ionizing radiation attenuant comprises barium, barium sulfate or barium salts.

5. The composite fabric of claim 4, wherein the polymer matrix is selected from the group consisting of polyolefins, polyethylene, polypropylene, thermal polyolefins, thermal polyolefin elastomer, vinyl polymers, polyvinyl acetate, vinyl acetate copolymers, acrylic polymers, polymethylenthacrylate, thermoset polymers, silicones, urethane polymers, elastomeric compounds, styrene-butadiene rubber, styrene-isoprene rubber, polybutadiene, polyisoprene, butyl rubber, epoxy polymers, polyvinyl alcohol, natural latex, ethylene vinyl acetate, polyester, and blends thereof.

6. The composite fabric of claim 4, wherein the polymer matrix if flame resistant of retardant.

7. The composite fabric of claim 1, wherein the permeation efficiency of the composite is greater than 50% when exposed to the chemicals included on ASTM F1001.

8. The composite fabric of claim 7, wherein the permeation efficiency is greater than 75% when exposed to the chemicals included on ASTM F1001.

9. The composite fabric of claim 7, wherein the permeation efficiency is 100% when exposed to the chemicals included on ASTM F1001.

10. A chemically resistant radiation attenuation composite barrier fabric comprising an ionizing radiation attenuation layer comprising a spunbond polypropylene supporting substrate, a film formed of a thermoplastic polyolefin matrix containing 40–80 % by weight barium sulfate covering one surface of the spunbond polypropylene supporting substrate, and a knit fabric layer adhered to said film, and a chemical barrier layer adhered to a surface of the spunbond polypropylene supporting substrate, said chemical barrier layer comprising a coextruded barrier film having polyolefin outter layers and a polyvinylidene chloride interior layer.

11. The composite fabric of claim 10 wherein said film has a thickness of 0.5 mil to 30 mil, and said spunbond polypropylene supporting substrate has a basis weight of 0.25 to 4.0 ounce per square yard.

12. The composite fabric of claim 10 wherein said knit fabric is a knitted polyester fabric and is adhered to said film by a solvent-based polyurethane adhesive.

13. The composite fabric of claim 10 wherein said chemical barrier layer is thermally laminated to the spunbond surface of said radiation attenuation layer.

14. An article of manufacture fabricated from the composite fabric of claim 10 in the form of a protective shelter, patient wrap, or human remains bag.

15. A protective garment comprising the composite fabric of claim 10.

16. The protective garment of claim 15 which includes seams, and a seam tape covering the seams, and wherin the seam tape is formed from a chemically resistant radiation attenuation composite barrier fabric, comprising a first ply having radiation attenuation properties and comprising a mixture of a polymer matrix and a radiation attenuant, and a second ply having chemical barrier properties.

17. A chemically resistant radiation attenuation composite barrier fabric comprising at least one chemical barrier layer, at least one ionizing radiation attenuation layer, and an additional reinforcing layer of a woven, knitted or nonwoven construction adhered to said at least one chemical barrier layer or to said at least one radiation attenuation layer by solvent or aqueous based adhesive lamination, thermal lamination, extrusion lamination, powder bond adhesive lamination, ultrasonic lamination, flame lamination, calendering, or pressure sensitive adhesive lamination, and an organophosphate hydrolase enzyme and/or oxidizing polymer thus rendering the composite reactive to phosphorous-based and oxidizable chemicals such as military chemical warfare agents, wherein the composite fabric has at least 8 hours resistance to the military chemical agents distilled mustard (HD), Sarin (GB), Soman (GD), Lewisite (L), and Nerve Agent (Vx), and the composite further passes ASTM F1671.

* * * * *

UNITED STATES PATENT AND TRADEMARK OFFICE
CERTIFICATE OF CORRECTION

PATENT NO. : 7,196,023 B2  
APPLICATION NO. : 10/816398  
DATED : March 27, 2007  
INVENTOR(S) : Langley et al.

Page 1 of 1

It is certified that error appears in the above-identified patent and that said Letters Patent is hereby corrected as shown below:

Column 13,

Line 22, "rediation" should read --radiation--;

Lines 24 and 25, "polumer" should read --polymer--;

Line 50, "if" should read --is--.

Column 14,

Line 14, "outter" should read --outer--;

Line 31, "wherin" should read --wherein--.

Signed and Sealed this

Twenty-fourth Day of July, 2007

JON W. DUDAS  
*Director of the United States Patent and Trademark Office*